Figure 1:
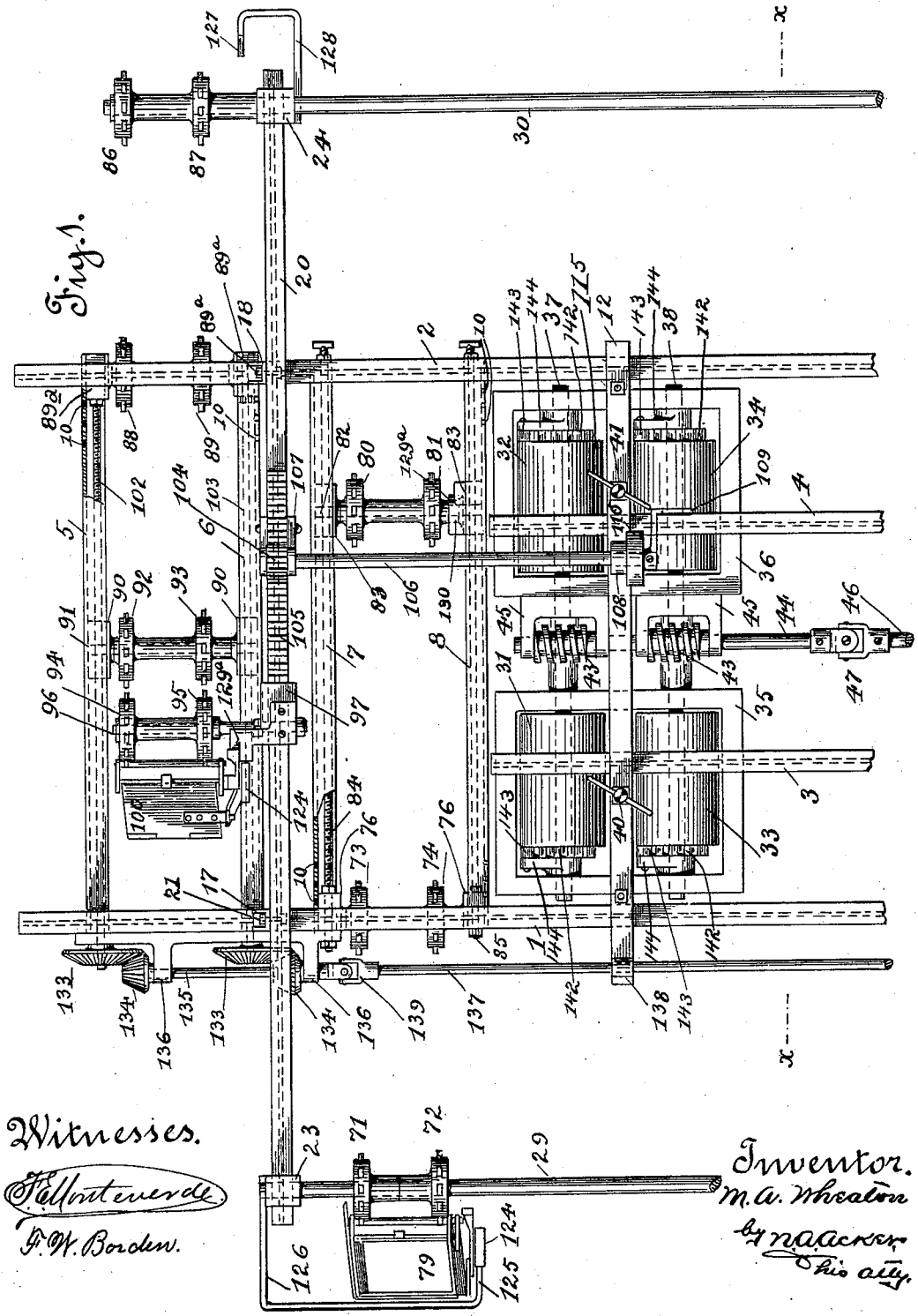

(No Model.)

9 Sheets—Sheet 1.

M. A. WHEATON.
EXCAVATING MACHINE.

No. 590,926. Patented Sept. 28, 1897.

Witnesses.
Fel Monteverde
F. W. Borden.

Inventor.
M. A. Wheaton
by N. A. Acker
his atty.

THE NORRIS PETERS CO., PHOTO-LITHO., WASHINGTON, D. C.

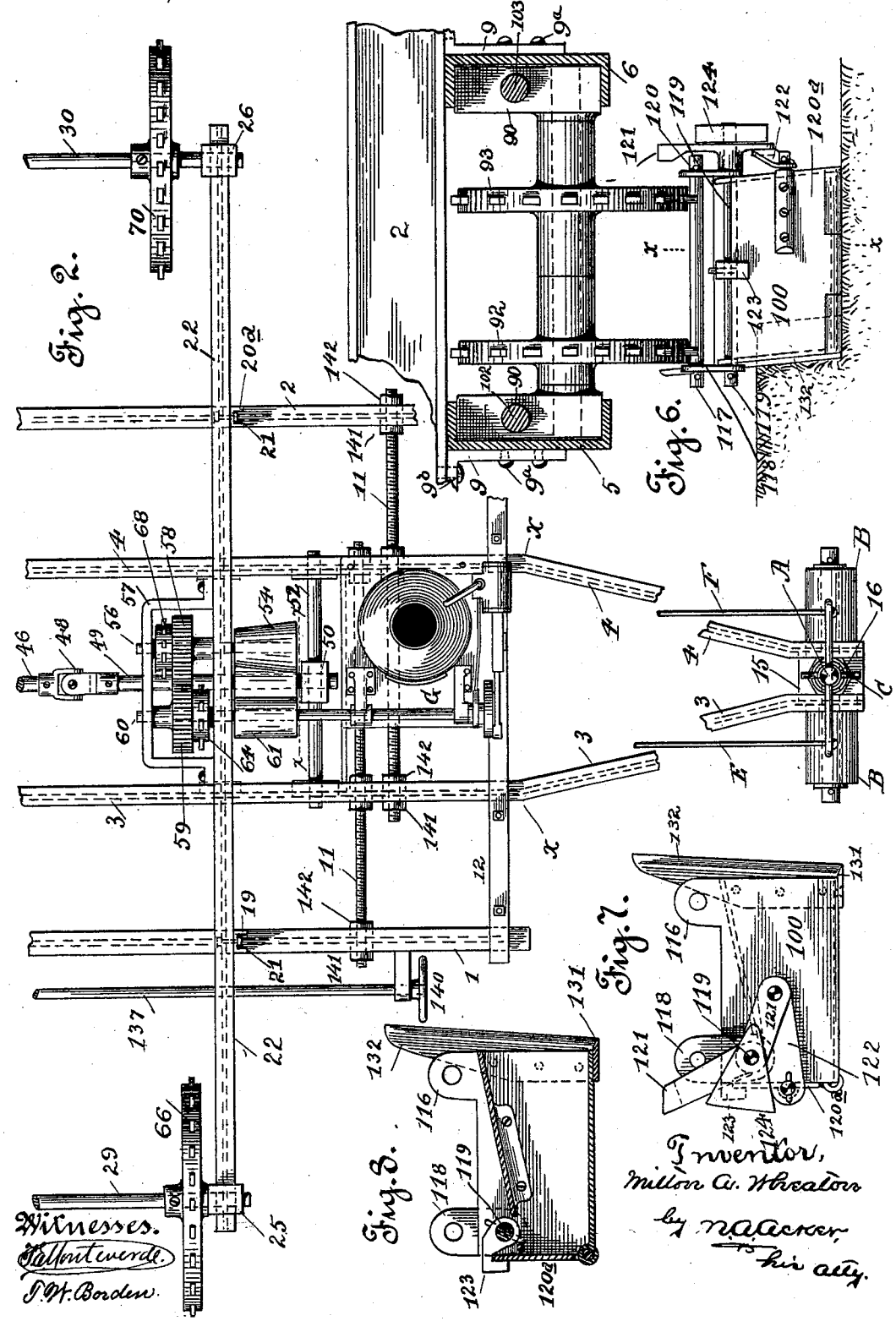

(No Model.)
9 Sheets—Sheet 3.
M. A. WHEATON.
EXCAVATING MACHINE.
No. 590,926.
Patented Sept. 28, 1897.
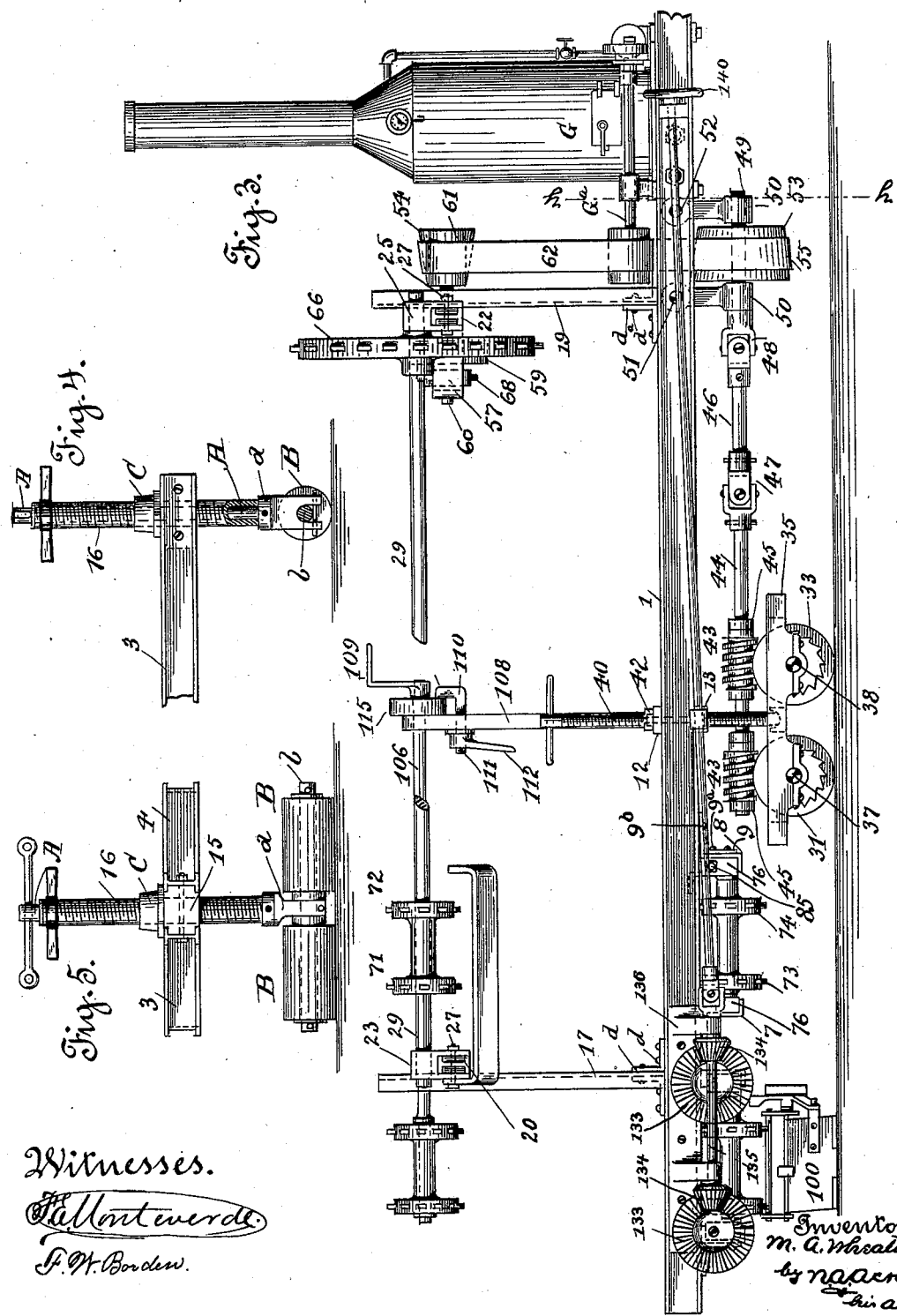

(No Model.)  9 Sheets—Sheet 4.
M. A. WHEATON.
EXCAVATING MACHINE.

No. 590,926.  Patented Sept. 28, 1897.

Witnesses.  Inventor.
Milton A. Wheaton

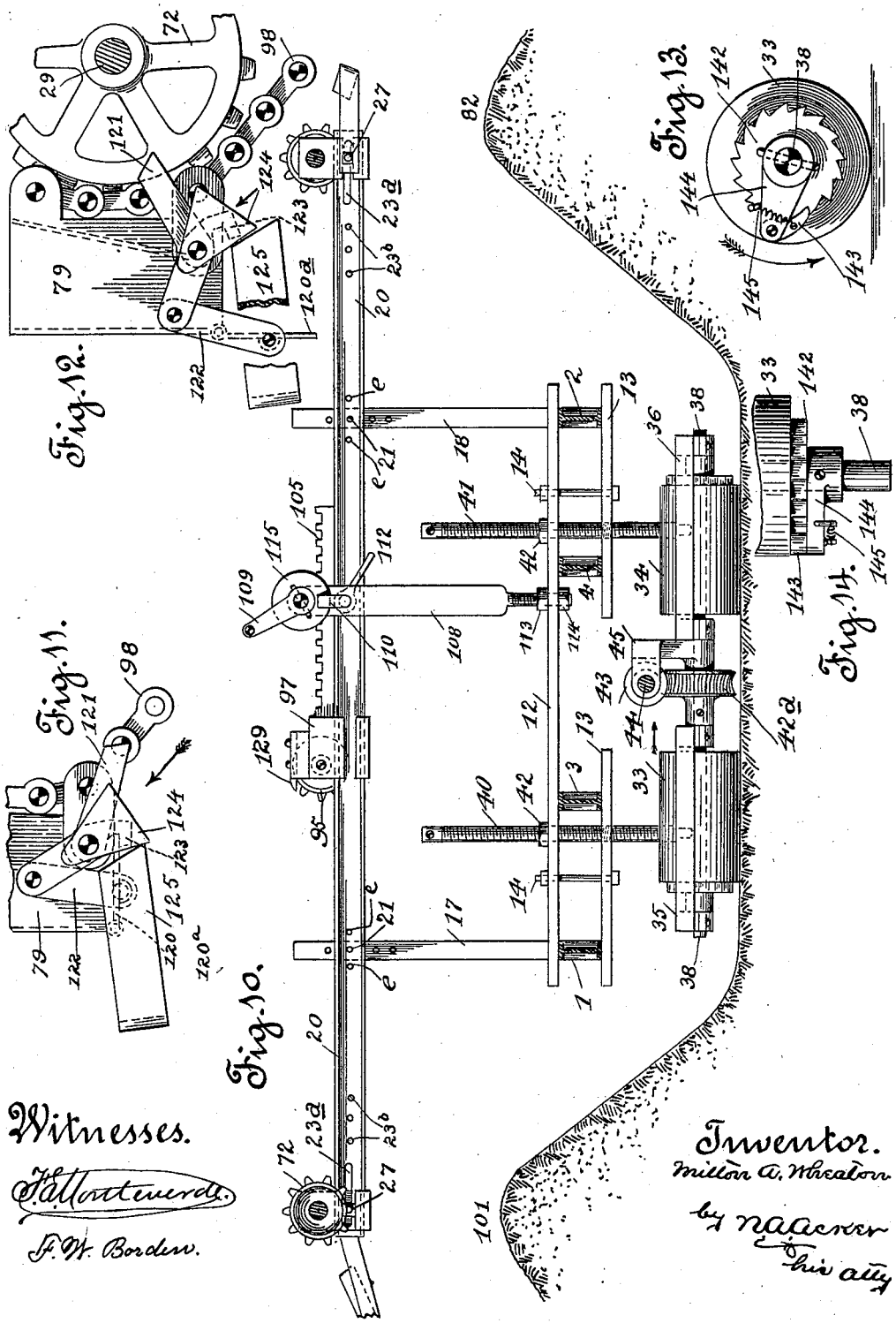
(No Model.)  9 Sheets—Sheet 5.
M. A. WHEATON.
EXCAVATING MACHINE.
No. 590,926.  Patented Sept. 28, 1897.

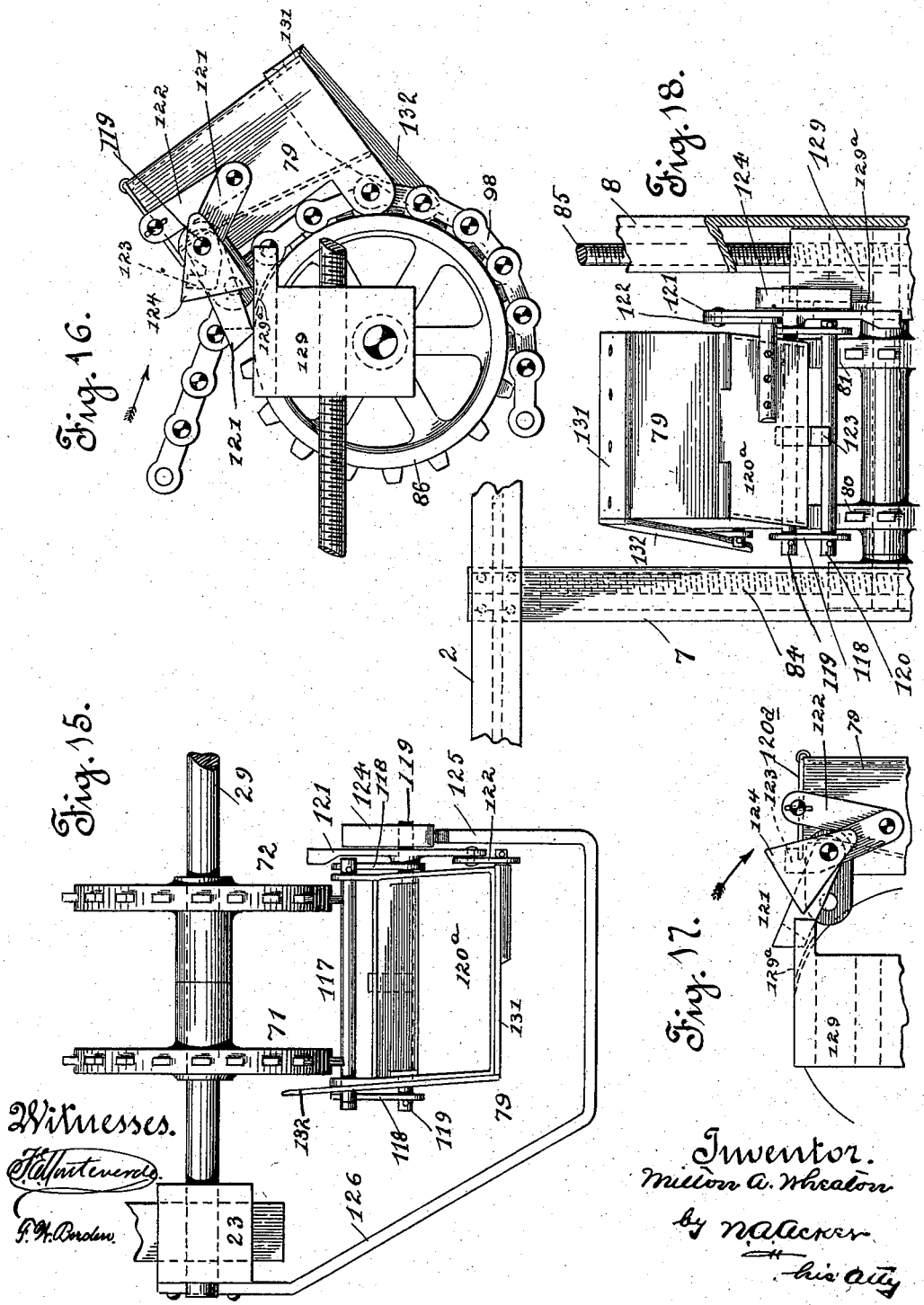

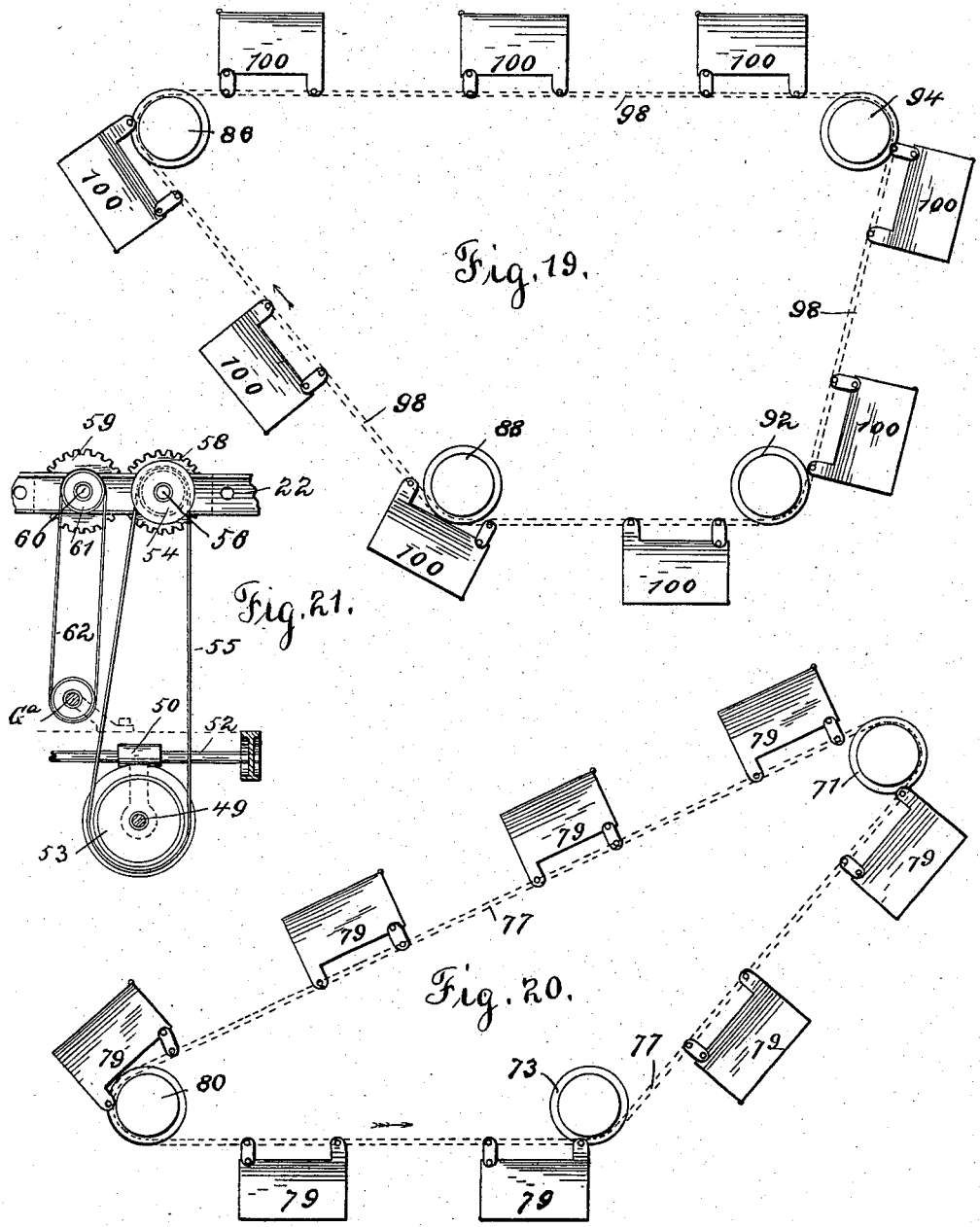

(No Model.) 9 Sheets—Sheet 8.
M. A. WHEATON.
EXCAVATING MACHINE.
No. 590,926. Patented Sept. 28, 1897.
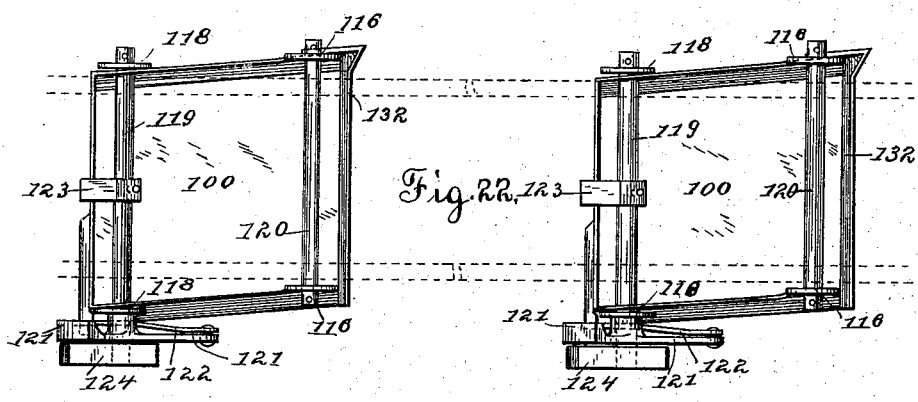
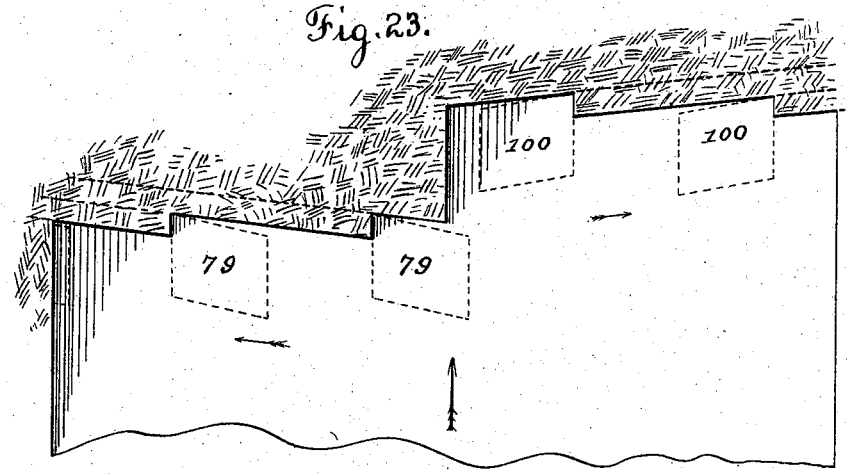

(No Model.) 9 Sheets—Sheet 9.
M. A. WHEATON.
EXCAVATING MACHINE.
No. 590,926. Patented Sept. 28, 1897.
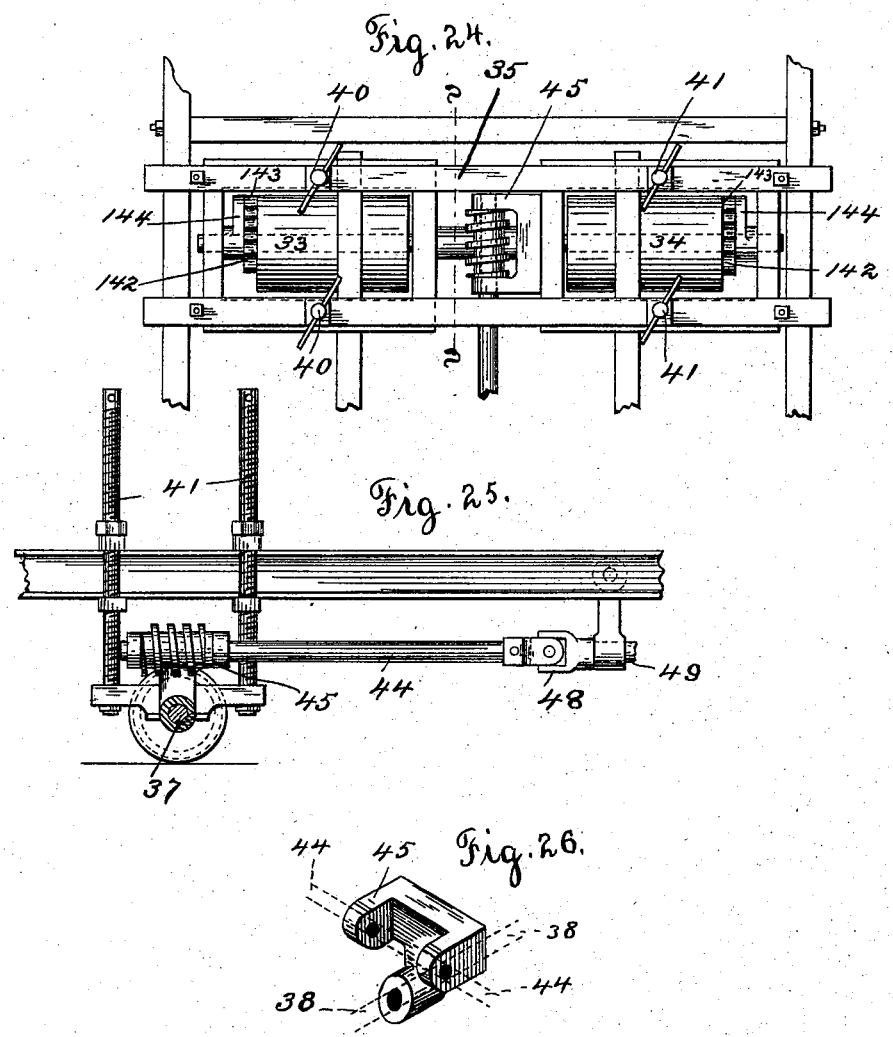
Witnesses,
Jos. H. Milans.
Chas. W. Parker.
Inventor,
Milton A. Wheaton
by N. A. Acker,
his atty.

UNITED STATES PATENT OFFICE.

MILTON A. WHEATON, OF SAN FRANCISCO, CALIFORNIA.

EXCAVATING-MACHINE.

SPECIFICATION forming part of Letters Patent No. 590,926, dated September 28, 1897.

Application filed March 31, 1897. Serial No. 630,157. (No model.)

*To all whom it may concern:*

Be it known that I, MILTON A. WHEATON, a citizen of the United States, residing at San Francisco, in the county of San Francisco and State of California, have invented a certain new and useful Excavating-Machine; and I do hereby declare that the following is a full, clear, and exact description thereof.

My invention consists of a new excavating-machine that is made upon a new general plan, and of devices and subcombinations of devices and arrangements thereof which are used in constructing the machine and which constitute parts and portions thereof.

My machine is designed more especially for the excavation and building of irrigating canals and ditches. Such canals and ditches are usually made with a shallow excavation and with elevated banks in order that they may carry water in a stream whose surface shall be at a higher elevation than the surface of the surrounding lands which are intended to be irrigated from the canal in order that the water may be led out of the canal and over and upon the said lands wherever desired.

The plan of my excavator includes a rectangular frame that is carried upon wheels or rollers which may run in the bottom of the finished canal. Two sets of parallel chains, each with a series of buckets attached thereto at suitable distances apart, travel crosswise of the machine, and, while so traveling, each bucket cuts loose some of the soil that is being excavated and loads itself therewith and carries and deposits it upon one of the banks of the excavation. One set of such parallel chains, with the series of buckets which it carries, travels in and crosswise of the excavation that is being made and carries its loaded buckets toward one of the banks thereof, and the other set of parallel chains with its series of buckets travels in and crosswise of the excavation in the opposite direction and carries its loaded buckets toward the other bank. As each bucket reaches the edge of the excavation it rises and moves upward in a vertically-inclined direction, carrying its load over the bank that is being made, and when the bucket reaches the proper position above the bank its end gate opens and its load of material drops out of the bucket upon the bank and is added thereto. The front vertical edge of each bucket cuts into the soil that is being excavated, the cut of each bucket extending from the top to the bottom of the excavation, said buckets cutting a slice of soil from the wall of earth that rises at the front end of the excavation already made, and which wall is nearly vertical. Each set of said chains, with its series of buckets attached thereto, travels constantly and at a uniform rate of speed in one and the same direction and has no reciprocating motions. One set of said chains is placed in the machine in advance of the other set, and their inner extremities lap past each other so that there will be no ridges of earth left in the bottom of the canal, but the entire width of such bottom will be cut level and left in a finished condition as fast as the machine travels over it. The machine travels lengthwise with the canal that it is making, and it travels forward at a constant and uniform rate of speed. It never stops while doing its work, but it keeps up a constant unceasing uniform movement, so that each bucket is carried forward along the line of the excavation or canal far enough to enable it to reach and cut loose and carry away a new slice of the soil from the wall of earth that is always at the forward end of the excavation as the same is left by the preceding bucket. As the said chains with their series of buckets travel at right angles with the machine, while the machine itself travels constantly forward lengthwise with the excavation being made, it follows that the buckets are given a compound movement that partakes of both their own motion crosswise of the machine and also of the forward motion of the machine. In consequence of this compound lateral and forward movement of the chains and buckets each of the slices of earth which each bucket cuts loose and carries away will be cut along a lateral line that inclines somewhat forward of a right angle with the line of the canal as such lateral line runs toward the bank on which earth is to be deposited. Also the forward side of each bucket is inclined backward from its front to its rear end in order that such forward side of the bucket may run clear of the said wall of earth at the front end of the excavation against which the forward motion of the machine would otherwise force it. The term "forward" used herein refers to the direction in which the machine travels when at work, and the term "backward" refers to the opposite direction.

In order to comprehend my invention and the working thereof, reference must be had to the accompanying sheets of drawings, wherein—

Figure 9:
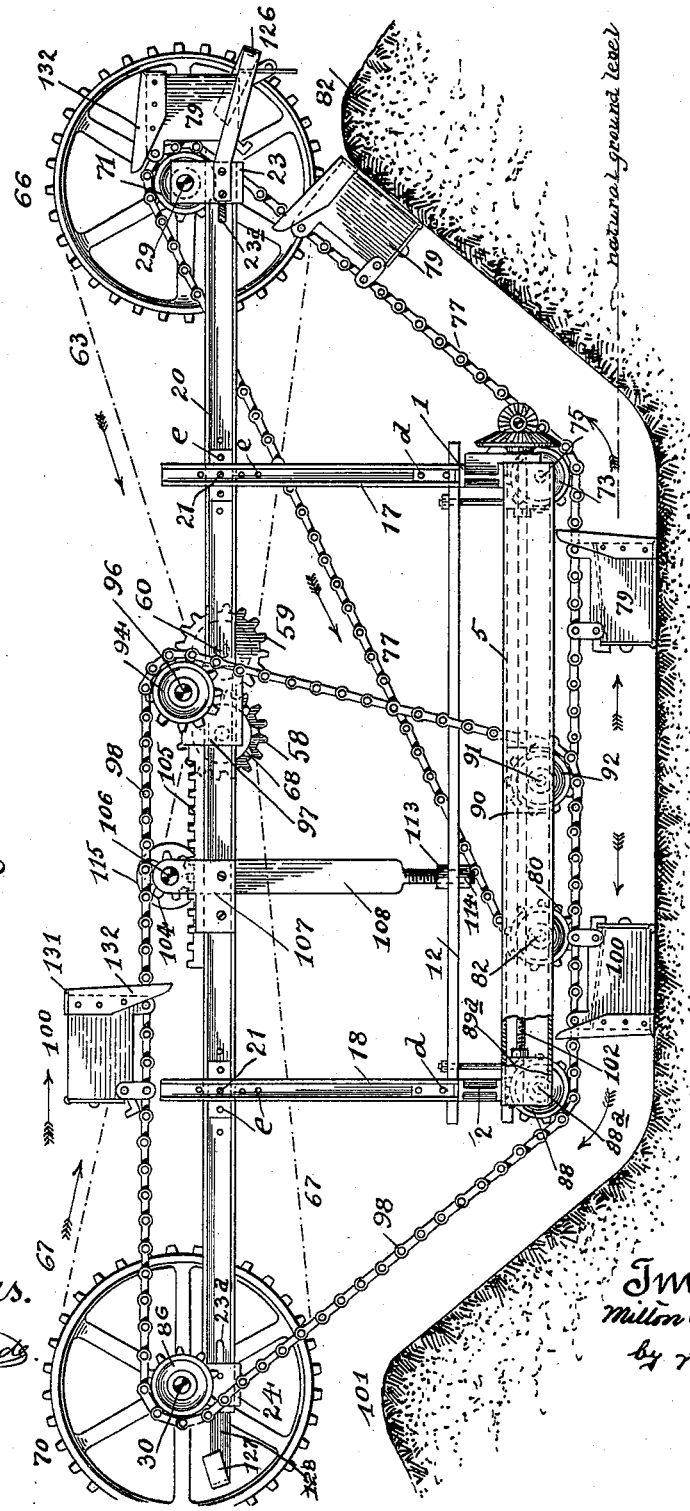

Figure 1 is a top plan view of the front half of the machine with the carrier-chains removed, showing the position of one of the forward cutting-buckets immediately after being locked and of one of the rear buckets after being released to dump the load. Fig. 2 is a similar view, partly broken, of the rear half of the machine. Fig. 3 is a side view in elevation, partly broken, taken from the left-hand side of the machine, the carrier and driving chains being removed. Fig. 4 is a similar view of the rear end portion of the machine omitted from Fig. 3. Fig. 5 is a rear view in elevation of the same mechanism illustrated by Fig. 4. Fig. 6 is a detail view, partly in section, of a portion of the forward end of the machine, showing parts in elevation as seen from the left-hand side of the machine and showing the rear end of one of the buckets of the forward series while the bucket is making its cut in the earth crosswise of the canal being excavated. Fig. 7 is an enlarged detail view of the rear side of one of the buckets of the forward series. Fig. 8 is a detail longitudinal sectional view of a bucket on the line $x\,x$, Fig. 6, looking toward the left. Fig. 9 is an end elevation of the front portion of the machine in operation, some of the buckets and other portions being omitted for the sake of clearness. Fig. 10 is a cross-sectional view, in rear elevation, of the machine on line $x\,x$, Fig. 1, certain parts of the forward portion of the machine being omitted. Fig. 11 is an enlarged broken detail view, in side elevation, of the lower portion of a bucket, the trip mechanism being shown just prior to releasing the hinged bottom of the bucket, the direction of movement of the bucket being indicated by the arrow. Fig. 12 is a similar view of a bucket, showing the position of the trip mechanism immediately after the release of the hinged bottom, the direction of movement of the bucket being indicated by the arrow. Fig. 13 is an enlarged detail view, in end elevation, of one of the supporting-rollers, showing the ratchet-and-pawl mechanism forming connection between roll and axle. Fig. 14 is a top plan view of the ratchet-and-pawl mechanism, the roll being shown broken away. Fig. 15 is a top plan view of the mechanism illustrated in Fig. 12, showing the sprocket-wheels, drive-shaft, and trip-bracket for the buckets carried by the rear set of chains, the latter being omitted. Fig. 16 is a detail rear side view in elevation showing one of the buckets of the rear series in position for locking, the arrow indicating the direction of movement of the bucket. Fig. 17 is a similar view, partly broken, showing the position of the locking mechanism after the bucket has been closed and locked, the arrow indicating the direction of movement of the bucket. Fig. 18 is a top plan view of one of the buckets and lock mechanism illustrated in Fig. 16, showing a portion of the channel-iron cross-beams supporting the bearing-blocks. Fig. 19 is a view in elevation of one of the forward carrier-chains with the full series of buckets attached thereto. Fig. 20 is a similar view of one of the rear carrier-chains with the full series of buckets attached thereto. Fig. 21 is a detail sectional view, in rear elevation, of the mechanism for transmitting power from the engine, said view being taken on the line $y\,y$, Fig. 3. Fig. 22 is a top plan view of the buckets, showing the inclinations thereof from front to rear. Fig. 23 is a diagrammatic top plan view of the canal and unexcavated earth, illustrating the cut which each bucket makes into the earth being excavated during the working of the machine, the buckets being shown as cutting from the longitudinal center line of the canal and the lateral travel of the buckets being indicated by arrows, as is also the forward movement of the machine. Fig. 24 is a top plan view showing a modification of the truck in which only a single pair of supporting-rollers are employed. Fig. 25 is a sectional side view in elevation taken on the line $v\,v$, Fig. 24; and Fig. 26 is a detail view of the supporting-bracket for the main drive-shaft, said bracket being illustrated as detached from the machine.

The main or base frame of the machine in the present instance is composed of the outer longitudinal side beams 1 2 and the inner longitudinal beams 3 4, the outer side beams being connected, near their front portion, by means of the channel-iron cross-beams 5, 6, 7, and 8, which cross-beams are secured, preferably, to the under face or edge of the said outer longitudinal side beams by means of brackets 9, which are secured to the beams by removable bolts $9^a\,9^b$, the former passing through two of the series of bolt-holes 10, formed in the sides of the channel-iron cross-beams, Figs. 1 to 6. By thus uniting the cross-beams to the longitudinal side beams 1 2 lateral adjustment may be given to the forward end portion of said side beams, by adjusting the bolts $9^a$ to a different set of holes 10 in the cross-beams in order to move the same toward or from each other, so as to increase or decrease the width of the main frame.

The inner longitudinal beams 3 4 terminate at their forward ends at points slightly back from the cross-beam 8. As a convenient means for adjustably securing the beams 3 4 in their proper positions relative to each other and to the beams 1 2 I employ a series of clamping-plates 12 13, (two only being shown for the purpose of clearness and illustration,) the former resting on the upper faces of the beams and extending across the frame and the latter resting against the lower or under faces of the beams. To tightly clamp the plates against the beams, any suitable means can be employed, conveniently bolts 14, which pass through the plates preferably at points between the outer and inner beams, as shown in Fig. 10, the bolts being provided with suitable clamping or tightening nuts. The forward plate 13, which is located directly over the roller-truck, presently to be referred to, is formed of two short sections, leaving a space between their inner ends for the purpose of avoiding interference with the driving mechanism for the rollers. The top clamping-plates 12 while serving as clamping-plates also serve as supports for a platform. Any convenient number of plates may be employed, either for strengthening the frame or for serving as platform-supports. The plates 12 13, together with the beams 1 2 3 4, constitute the main frame and form a very rigid and substantial structure.

In addition to the clamping-plates 12 13 I by preference connect the beams at points by screw-rods 11 11, the same passing through suitable apertures in the beams, and are provided with clamping-nuts 141 142, resting against the sides of the beams. By adjusting these nuts the relative lateral positions of the beams can be changed, while their independent movement is positively prevented after adjustment. These screws 11 11 are useful for properly adjusting or locating the beams 1 2 3 4 before the clamps 12 13 are applied, and also assist the clamps in maintaining the beams in their proper relative positions. The longitudinal beams 3 4 extend beyond the rear ends of beams 1 2, beyond the point $x$, gradually converging toward each other, their inner ends being suitably bolted or secured to the end block 15. This particular construction is, however, unimportant, as any formation or arrangement of the frame-beams that will secure the block 15 in its place is all that is required. Through this end block works the screw-threaded hollow adjusting sleeve or stem 16, within which is fitted and works the steering-post A. This steering-post terminates at its lower end in a head $a$, through which extends the shaft $b$, carrying the steering-rollers B. The screw-threaded sleeve or stem is held in adjusted position by means of the lock-nut C, which nut bears upon the upper face of the end block 15. By screwing the hollow sleeve 16 up or down the rear end of the machine may be lowered or raised, as desired.

The upper end of what may be termed the "vertically-adjustable steering-post" A is connected to any suitable steering device by means of the rods, chains, or cables E F. This steering wheel or device, to which the rods E F are attached, may be located near the driving-engine G, which is placed upon a suitable platform mounted upon the frame of the machine, in order that the same may be within convenient reach of the person operating the engine.

To the longitudinal side beams 1 2 are fastened by angle-brackets $d$ and pins or bolts $d^a$ the four uprights 17, 18, 19, and $20^a$, the forward uprights 17 and 18 being united by the cross-beam 20 by means of the bolts 21, which bolts fit or pass through one of a series of bolt-holes $e$, formed in the uprights 17 and 18 and in the side of beam 20, in order that the said cross-beam 20 may have vertical adjustments and the uprights lateral adjustments given thereto. The rear uprights 19 and $20^a$ are connected by the cross-beam 22, which cross-beam, like the forward one, has vertical adjustment by being connected to the said rear uprights 19 and $20^a$, and the uprights have lateral adjustments by pins or bolts which fit or pass through one of a series of bolt-holes formed in the said rear uprights in a manner similar to that of the forward uprights.

Upon each end of the cross-beam 20 is mounted one of the slide bearing-boxes 23 24, and upon the cross-beam 22 the slide bearing-boxes 25 and 26. These slide bearing-boxes are held in adjusted positions by means of the set-screw bolts 27, which extend through said boxes and through elongated openings $23^a$, cut through the outer end portion of the cross-beams 20 and 22. The boxes are formed with one side open or cut away to allow the head of the bolt 27 to pass through and rest against the side of the beam above and below the slot $23^a$. By drawing the nut on the opposite end of the bolt up against the block the head is tightly drawn onto the beam, thereby binding the block in place. The boxes may still be further adjusted, using the holes $23^b$. Within the slide bearing-boxes 24 and 26 works the longitudinal drive-shaft 30; said drive-shaft being operated by and serving to operate the cutting and laterally-delivering mechanism, as hereinafter described.

The main body or frame of the machine is supported by, in the present case, four rollers 31, 32, 33, and 34, which are secured or work within the truck-frames 35 and 36, the rolls 31 and 32 being loosely mounted on a common shaft or axle 37, and the rolls 33 and 34 on the shaft or axle 38; said axles or shafts 37 and 38 working in bearings of the truck-frames. The trucks are connected to the main frame in any convenient or approved manner which will permit of the main frame being adjusted upward or downward. A convenient means for this purpose is shown in the drawings, wherein suitable screw-standards 40 and 41 are shown, the same passing through apertures in plates 12 and 13, one of which apertures is threaded, there being one screw for each truck. The screw-standards are loosely connected to the trucks in any suitable manner, so as to permit of a slight rocking or tilting movement of either the truck or frame and to furnish a suitable bearing for carrying the load. In the present instance the lower ends of the standards are rounded and fit in sockets formed in the truck-frames. (See Fig. 3.) The standards are locked against rotation by suitable lock-nuts 42.

Upon each shaft or axle 37 38 between the truck-frames is secured the worm-gear 42$^a$, Fig. 10, with which mesh the worms 43, mounted upon the central propelling-shaft 44. This shaft 44 is held in position by and works in bearings of the supporting-brackets 45. These brackets are carried by the shafts 37 38, the shafts passing through bearings in the lower portion of the bracket. Each shaft 37 and 38 of the supporting-rollers holds the brackets in position crosswise of the machine, while the shaft 44 holds the same in proper position lengthwise of the machine. The rear or outer end of shaft 44 is connected to the coupling 46 by the universal joint 47, which coupling is secured by the universal joint 48 to the belt-wheel shaft 49; said shaft working in bearings 50, suspended by the cross-shafts 51 52, extending through the longitudinal beams 3 4. By forming the connections between the propelling-shaft 44 and the belt-wheel shaft 49, through the universal-jointed coupling 46, the belt-wheel shaft 49 may be raised or lowered with the main frame without disturbing the driving position of the said propelling-shaft 44.

Upon the rearwardly-projecting end of the shaft 49 is located the belt-wheel 53, which is connected with and is driven by the belt-wheel 54, through the medium of the belt 55. This belt-wheel 54 is mounted upon the rear end of the axle 56, which works in bearings in the rear cross-beam 22 and supporting-bracket 57. Upon the axle 56, between the said rear cross-beam 22 and the supporting-bracket 57, is mounted the gear-wheel 58, which meshes with and is driven by the drive-gear 59, mounted upon the shaft 60, working in bearings in the rear cross-beam and the supporting-bracket 57. The shaft 60 projects beyond the cross-beam 22 and has secured thereon the belt-wheel 61, which is connected to and driven direct from the driving-shaft G$^a$ of the engine G, by means of the belt 62, passing over pulley 62$^a$ on the shaft G$^a$, the motion of the said shaft 60 being transmitted to the propelling-shaft 44, through the medium of the gear-wheels 59 and 58 and the belt-wheels 53 and 54, as hereinbefore explained. Said belt-buckets 53 and 54 being cone-shaped permit the shifting of the belt 55 to regulate the relative speed of the machine and excavating mechanism.

The drive-shaft 29 receives its motion or is driven from the shaft 60 by means of the sprocket-chain 63, Fig. 9, which works over the sprocket-gear 64, conveniently secured upon the hub of the drive-gear 59, and the sprocket-wheel 66, mounted upon the said drive-shaft, while motion is imparted to the drive-shaft 30, through the medium of the sprocket-chain 67, Fig. 9, which works over the sprocket-gear 68, secured to the hub of the gear-wheel 58, and the sprocket-wheel 70, mounted upon the drive-shaft 30. Inasmuch as the gears 59 and 58 are driven in opposite directions it is obvious that opposite rotary motion will be imparted to the parallel drive-shafts 29 and 30.

Upon the drive-shaft 29, near its forward end, are rigidly secured a distance apart the sprocket-wheels 71 72, which are in line with the sprocket-wheels 73 74, secured upon the axle 75, Fig. 9, working in fixed bearing-blocks 76, fitted within the channel-iron cross-beams 7 8. Over these sprocket-wheels 71, 72, 73, 74, 80, and 81 work the endless sprocket-chains 77, to which chains are secured what I term the "rear" series of buckets 79, Figs. 9 and 20. The sprocket-wheels 80 and 81 are secured upon the axle 82, which works in sliding bearing-blocks 83, secured near one end of the machine within the channel-iron cross-beams 7 8.

The buckets 79 are constructed, as hereinafter explained, to automatically dump or discharge their load as carried around the sprocket-wheels 71 72 to, in the present instance, the left-hand side of the machine viewed from the rear, the dumped or discharged soil or dirt serving to form the embankment 82 at the left-hand side of the cut.

Within the channel-iron cross-beams 7 8 work the screw-rods 84 85. These rods pass through a longitudinal smooth bore cut through each bearing-block 76 and through a longitudinally-screw-threaded bore in the slide bearing-blocks 83. As these screw-rods 84 85 are turned to the right or to the left the slide bearing-blocks 83 will be moved transverse of the machine, so as to carry the sprocket-wheels 80 81 inward or outward in order to loosen or tighten the sprocket-chains 77. These rods 84 85 may be turned in any convenient manner.

Upon the forward end of the drive-shaft 30 beyond the cross-beam 20 are rigidly secured the sprocket-wheels 86 87 a distance apart, which are in line with the lower sprocket guide-wheels 88 89, secured upon the axle 88$^a$, working in fixed bearing-blocks 89$^a$, which blocks are fitted in the channel-iron cross-beams 5 6, in the present instance near the right-hand side of the machine, viewed from the rear end. Within the said channel-iron cross-beams are also fitted the slide bearing-blocks 90 for the axle 91, upon which is secured, in line with the sprocket-wheels 88 89, the sprocket-wheels 92 93. Above these sprocket-wheels and in line with the sprocket-wheels 86 87 are located the idler sprocket-wheels 94 95, which sprocket-wheels are mounted upon a shaft or bracket 96, projecting from the slide-block 97, working upon the cross-beam 20. Over the sprocket-wheels 86, 87, 88, 89, 92, 93, 94, and 95 work the sprocket-chains 98, said chains being driven by the rotation of the sprocket-wheels 86 87. To these chains are attached the front series of buckets 100. The normal position of the sprocket-wheels 92 93 is such that as the buckets 100 are carried around under them by the endless traveling sprocket-chains 98 they will dip or cut into the soil at about the center of the canal being excavated, although the position of the sprocket-wheels 92 93 may be so adjusted, through the medium of the slide bearing-blocks 90, as to cause the buckets carried around them to dip or cut into the soil at either side of the center line of the excavation. The sprocket-chains 98 are driven in an opposite direction to the sprocket-chains 77. Consequently while the buckets carried by the chains 77 discharge at the left-hand side of the machine the buckets carried by the chains 98 discharge at the right-hand side, or opposite to those carried by the chains 77. As the buckets 100 are carried over the sprocket-wheels 86 87 the dirt contained therein is automatically dumped or deposited in order to form the side wall or embankment 101 on the opposite side of the canal or cut to the embankment or side wall 82.

Within the channel-iron cross-beams 5 6 work the screw-rods 102 103, which extend through a longitudinal smooth bore in each fixed bearing-block 89ª and through a longitudinal screw-threaded bore in each of the slide bearing-blocks 90. The screw-rods 102 103 extending through a screw-threaded bore in the slide-blocks 90 it is obvious that as the said screw-rods are turned to the right or to the left the slide-blocks 90 will be moved transverse of the machine, so as to carry the sprocket-wheels 92 93 toward the right or to the left hand side of the machine. It is by means of these screw-threaded rods that the position of the sprocket-wheels 92 93 is adjusted to any desired position crosswise of the canal in order that the cut of the front buckets 100 may be regulated. It may often happen that in excavating a canal it will pass through land which is higher on one side of the excavation than it is at the other side, and that consequently the earth on that side of the canal must be cut deeper and a larger quantity of earth excavated and removed than will be on the other side of the canal in order that a level bottom will be made for the canal. In such cases it is evident that if each series of buckets that are carried by the two different sets of sprocket-chains were to cut and carry away the soil from the longitudinal center line of the canal that much more soil would be carried to the bank that ran along the side of the canal at which the deepest cut was made than would be carried to the opposite bank, and that one bank would therefore be much larger than the opposite bank.

In order to make the banks of the same size on both sides of the canal where the land is not level in cross-section, as above described, I have provided means by which each series of buckets may be made to cut loose and carry to each bank the requisite amount of earth to make both banks of quite or approximately of the same size. To accomplish this result, I have placed the shaft of the sprocket-wheels 92 and 93 in the sliding bearings 90 and have arranged those sliding bearings so that they may be moved toward either side of the machine, as may be desired, by means of the screw-rods 102 and 103, as elsewhere explained. As the forward series of buckets pass around the sprocket-wheels 92 and 93 it is evident that the location of these wheels at any point along the cross-section of the canal will determine the longitudinal line of the canal from which such forward series of buckets will excavate the earth which they will carry and deposit upon the bank of the canal which they are forming. Therefore by moving the said sprocket-wheels 92 and 93 to the proper place the forward series of buckets will be made to cut loose and carry to the bank which they are forming one-half of the quantity of the earth that is to be excavated between the two banks. In so moving the said sprocket-wheels back and forth by the said screw-rods 102 103 the sprocket-chains 98 can be kept at the proper degree of tightness by means of the pinion 104 and rack 105, as elsewhere explained. The second or back series of sprocket-chains are placed far toward the side of the machine that is opposite to the sprocket-wheels 71 72, so that the back series of buckets 79 will be capable of cutting loose and carrying the earth from nearly the entire width of the canal to the bank which this back series of buckets will be building. By this arrangement the said back series of buckets will cut loose and carry to the bank which they are building all of the unexcavated material that is left within the canal by the first series of buckets whether said first series of buckets are made to excavate a greater or less part of the distance across the canal. By this construction and arrangement the machine can be made to regulate the relative sizes and strength of the two banks of the canal at the pleasure of the constructor.

The forward buckets are designed to cut from about the center of the machine to that side opposite the discharge of the buckets 79, any and all soil left by the forward buckets being gathered or collected in the rear buckets. If the buckets were arranged in longitudinal alinement, the rear buckets would not collect the soil left by the forward buckets. Consequently a clean bottom would not be given to the cut.

By means of the adjustable idler sprocket-wheels 94 95 the forward sprocket-chains may be readily loosened or tightened by simply moving the slide-block 97, carrying the said idler sprocket-wheels transverse of the machine along the cross-beam 20. This adjustment of the slide-block 97 is accomplished by means of the rack-pinion 104, meshing with the rack-bar 105, projecting from the slide-block 97, said rack-bar resting and sliding upon the cross-beam 20. Motion is imparted to the said rack-pinion 104 from the shaft 106, (upon the forward end of which it is secured,) which works through the upwardly-projecting bracket 107, attached to the face of the cross-beam 20 and through the adjustable screw-post 108. This shaft 106 may be operated in any suitable manner, but in the present case a crank-handle 109, Figs. 1, 3, and 10, for operating the same, is shown attached to the rear end thereof, said shaft being held from rotating in any position by means of the clutch-plate 110, which frictionally binds against or upon the face of the clutch-wheel 115, mounted upon the shaft 106. The stem 111, Fig. 3, of the clutch-plate fits through an opening formed in the screw-post 108, near its upper end, and is moved toward or from the clutch-wheel 115 by means of the screw-nut 112, which works upon the screw-threaded end of the stem 111. The lower end of the screw-post 108 passes through the clamp-plate 12, and is held in adjusted position by means of the lock-nuts 113 114, Fig. 10, which bear upon the upper and lower faces, respectively, of the said clamp-plate. By means of these lock-nuts vertical adjustment may be given to the screw-post 108 in order that the said screw-post may be raised or lowered in accordance with the vertical adjustment given to the cross-beams 20 and 22.

Any suitable style of excavating-buckets may be used; but I have shown herein the style that I prefer and believe to be the best. Since the machine is constantly traveling slowly forward while the buckets are traveling at right angles with the forward movement of the machine, the forward vertical side of each bucket is made to incline backward from its front vertical cutting edge to its rear end in order that the forward movement of the machine may not carry and press such vertical side of the bucket against the wall of unexcavated earth that is always at the forward end of the excavation. The direction of travel of the buckets is created by the compound movement of the machine moving forward and the lateral movement of the buckets at right angles with the machine while they are at work excavating. The forward vertical edge of each bucket cuts its own way in the earth, but back of such cutting edge the bucket must be kept clear of the said wall of unexcavated earth, and by making the said front vertical side of the bucket to recede or incline backward from its front cutting edge to its rear end such clearance is accomplished. The forward front edge of the bottom of the bucket is, however, made parallel with the line of travel of the machine and of the bank at the side of the canal in order that it will form such bank with a smooth surface and not make vertical ridges or depressions therein. The front vertical cutting edge and the front horizontal bottom edge of each bucket are formed with removable knives, as shown in the drawings, in order to have the best quality of cutting edges and such as can be easily removed and sharpened and replaced, so as to be constantly and easily kept in good operative condition. The back vertical side of the bucket I prefer to make parallel with the said receding front vertical side of the bucket in order that the bucket may carry a full load and furnish a large opening at its rear end to insure a free discharge of its load. The forward side of the bucket I forwardly incline from its lower edge to its top edge, so that it will cut the wall of the excavation and leave it standing at an inclination, thus rendering it less liable to fall or cave in.

The swinging gate 120$^a$ is placed at the back end of each bucket in order that the load may be discharged from the bucket at just the desired moment and to prevent the load or any part of it from being discharged or lost from the bucket until the proper time arrives for discharging its entire load. The front ends of the said buckets 79 and 100 are formed with the projecting ears 116, Figs. 6, 7, and 8, and said buckets are secured at their front ends to the sprocket-chains 77 and 98, respectively, by the cross-bars 117, which bars pass through the ears 116 of the buckets through the links of the sprocket-chains. The rear end of each bucket is attached to the sprocket-chains by means of the loose links 118, so as to allow the chains to bend while passing around the sprocket-wheels, said links being secured to the cross-rod 119, which extends through the side walls of the buckets, and the cross-rod 120, which passes through the links of the sprocket-chains and through the links 118. These buckets are placed at any desired intervals along the laterally-traveling sprocket-chains, Figs. 19 and 20.

Each excavating-bucket is provided with a hinged gate 120$^a$, which is at the rear end of the bucket while the bucket is in a horizontal position. This gate opens automatically to dump the load out of the bucket when the bucket reaches the proper position over the embankment which is being formed. When the bucket reaches this position, it is substantially in a vertical position, and the gate 120$^a$ is then temporarily the bottom of the bucket. The hinged gate of each bucket is connected to the inner end of a bell-crank lever 121 by a link 122, which lever is mounted loosely upon the end of the oscillatory rod 119 at the rear of the bucket. Each hinged gate 120$^a$ is held closed during the travel of the bucket by a catch 123, which is secured rigidly to the oscillatory cross-rod 119 and which engages the free edge of said hinged gate. To the inner end of each oscillatory cross-rod 119 is rigidly secured, beyond the loose bell-crank lever 121, the triangular-shaped trip-lever 124. This trip-lever as the buckets 79 are carried around the sprocket-wheels 71 72 strikes against the arm 125 of the bracket 123, Figs. 1, 9, and 15, secured to and projecting from the slide-block 23 on the cross-beam 20, while the trip-lever secured to the oscillatory cross-rod of the buckets 100 strikes against the arm 127, Fig. 1, of the brackets 128, attached to and projecting from the slide-block 24 on the opposite end of the cross-beam 20 from that carrying the bracket 126. As the buckets 79 and 100 are carried past the arms 125 127 the triangular trip-levers 124 striking thereagainst rotate the oscillatory cross-rods 119, so as to throw the catch 123 away from or out of engagement with the free or swinging edge of the hinged gate 120ª of the buckets. When thus released, the hinged gate swings open downward and the load drops downward out of the bucket upon the bank being formed. The hinged gates of the buckets 79 are closed and locked as carried around the sprocket-wheels 80 81 by the outer end of the bell-crank lever 121, riding upon the cam-plate 129ª, secured upon one of the sliding blocks 83. This cam-plate 129ª is shown in elevation, Fig. 10, and in plan, Figs. 1, 16, and 18, and consists of a plate secured to an upper elevation of the sliding block 83 in a manner similar to that shown at 97, Fig. 10. This cam-plate is cut away and rounded at one end 129ª, Figs. 16 and 17. As the bell-crank lever rides upon this cut-away part of the cam-plate the inner end of said lever is thrown downward, which draws the link 122 therewith, so as to hold the hinged gate closed while being locked, which locking is accomplished by the triangular arm 124, riding upon the part of the cam-plate which is not cut away, Figs. 1, 16, and 17. The turning of the triangular cam 124 as carried over the said cam-plate oscillates the cross-rod 119, so as to throw the catch 123 over the edge of the hinged bottom 120ª, which has just been closed by the bell-crank 121 and link 122. The hinged gate remains thus locked until released by the triangular cam 124 again striking against the arm 125 of the bracket 126. The hinged gate of the forward bucket 100 is locked by the bell-crank lever thereof and the triangular cam is carried over the cam-plate 129, fastened to the slide-block 97, Fig. 10. Consequently these buckets are closed when carried over the idler sprocket-wheels 94 95. The devices and operation of closing the hinged gates of the forward buckets is the same as that described for closing the hinged gates of the rear buckets.

To the lower front edge of each bucket is bolted or otherwise secured the forwardly-projecting cutting blade or knife 131, and to the front side edge of said bucket is secured the forwardly-projecting cutting knife or blade 132, the upper end of said knife or blade 132 extending above the bucket, so as to better reach and cut away places in the bank which might be higher than the bucket. This knife forms the forward vertical cutting edge of the bucket.

The screw-rods 102 103 for operating the slide-blocks 90, carrying the sprocket-wheels 92 93, have secured upon their outer ends projecting beyond the longitudinal beam 1 the bevel-gears 133, with which mesh the bevel-pinions 134, secured upon the short longitudinal shaft 135, which shaft works in projecting brackets 136, secured to the longitudinal beam 1. This shaft 135 is connected by means of the universal joint to the longitudinal shaft 137, working in bearings 138. The shaft 137 is rotated by means of the hand-wheel 140, secured to the rear end thereof. This said shaft 137, as turned to the right or to the left, imparts its motion to the short shaft 135, carrying the bevel-pinions 134, which pinions, meshing with the gears 133, operate the screw-rods 102 103, so as to give transverse adjustment to the slide bearing-blocks 90.

On account of the constant forward movement of the machine each succeeding bucket will commence making its cut in the ground at a certain distance farther forward in the line of the canal than that at which the last preceding bucket commenced to make its cut. This distance will be equal to the distance which the machine moves forward during the time that intervenes between the commencement of the cut that is made by one bucket and the commencement of the cut that is made by the next succeeding or following bucket. As each bucket cuts the entire depth of the excavation at a single cut it follows that the load of each bucket will consist of a slice of earth that extends from the top to the bottom of the excavation in height and from the place where the cut begins to the edge of the excavation in length, and in thickness is equal to the distance which the machine travels forward between the commencement of the cuts that are made by two successive buckets one following the other while at work. Fig. 23 shows a top view of the buckets while they are excavating, showing their proper forms in plan, and it also shows the location of the series of buckets 100 in advance of the other series of buckets 79. The same Fig. 23 also shows the inclined lines upon which the buckets travel while excavating and also the shape of the surface of each strip of soil that is excavated by each of the buckets in making a single cut. There is an advantage in the inclination forward of the vertical knife that is at the front end of each bucket in that such inclination causes the blade to act as a vertical rudder and to steer the edge of the bucket forward into the uncut ground in the right direction while cutting. By a careful adjustment of the said forward inclination of said knife it will be made to steer the bucket so that it will run and cut naturally in just the right direction that is required, thus enabling me to dispense with the use of guide-rods for holding the endless carrier-chains 77 and 98 in position during the movement of the cutting-buckets.

It will be observed that each portion of the machine is capable of adjustment. Hence the apparatus may be regulated to meet the requirements of differents sizes of excavations. The longitudinal beams 1, 2, 3, and 4 may be given lateral adjustment—that is, they may be moved toward or from each other to decrease or increase the width of the main frame; also, the sliding bearing-blocks 23, 24, 25, and 26 may be moved along their respective carrying-bars 20 and 22, so as to place the several sprocket-wheels which the said bearing-blocks carry closer together or farther apart. By removing more or less of the links and buckets from the sprocket-chains 77 and 98 the parts can be adapted to the building of a narrower canal, and by adding more links to said sprocket-chains they can be adapted to the building of a wider canal. The entire fore part of the main frame of the machine or either side thereof may be raised or lowered vertically by means of the screw-posts 40 and 41, and such vertical movement of the main frame will give an increased or decreased vertical cut to the excavating-buckets.

As the forward movement of the machine and the lateral movements of the buckets are always constant and in the same direction there are no reciprocating, intermittent, or other lost motions, and no time lost thereby, but the work of the machine is continuous and very fast, and the canal being built by the machine is finished as fast as the machine travels forward, no double handling of the material is required, but the entire excavation is made and the soil removed and the embankments formed all in one continuous and complete operation.

Inasmuch as the supporting-rollers 31, 32, 33, and 34 are loosely mounted upon the cross shafts or axles 37 and 38 it is necessary that a connection should be made between the said rollers and said axles; and as some one or more of the rollers may at times roll faster over the ground than the other rollers would run when all the rollers traveled with exactly the same number of revolutions I have made the connections between the said rollers and the said axles in such manner that the rollers which make the most revolutions in passing over the ground may be allowed to keep their place in the machine without being partially dragged with great friction over the ground. This is accomplished by securing to the end of each roller the ratchet plate or wheel 142, the teeth of which are engaged by a pawl 143, fulcrumed to an arm 144, which is rigidly attached to and projects from each of the axles or shafts 37 38, said pawl being held against the ratchet by the spring 145. These pawls, engaging with the ratchet plates or wheels 142 of the rollers, force the said shafts or axles to rotate with such of the rollers as move the fastest with the least number of revolutions as they roll over the ground. The other rollers may roll over the ground and perform more revolutions without any dragging on the ground and the ratchet-wheel attached to the rollers may move forward under the pawls without hindrance.

It is not necessary that four supporting rollers or wheels be employed in connection with machines of this character, for if a light machine be built for the cutting of small canals only two supporting rollers or wheels need be employed, as illustrated in Figs. 24 and 25 of the drawings. In such cases the propelling-shaft 44 is connected to the drive-shaft 49 by a single universal joint or coupling 48. With two supporting rollers or wheels 33 34 only one truck-frame 35 is required. The connection between a single truck-frame and the main frame of the machine is the same as that made use of when two truck-frames are employed excepting that instead of two adjusting-posts, as illustrated in Fig. 1, four adjusting-posts are utilized, Fig. 24, in order that the truck-frame may be prevented from tilting during the travel or working of the machine.

I am aware that changes may be made in the arrangement of parts and details of construction herein shown and described without creating or necessitating a departure from the nature and scope of my invention. Consequently I do not wish to be understood as confining myself to the particular construction and arrangements of parts shown and described—for instance, it is obvious that by removing the endless carrier-chain 98, with its series of buckets 100, from the forward set of sprocket-wheels and placing the same over the rear set of sprocket-wheels in a reverse position and removing the rear endless carrier 77, with its series of buckets 79, from the rear set of sprocket-wheels and placing the same over the forward set of sprocket-wheels in a reverse position, what formerly was the front series of buckets will become the rear series and the rear series the front series. This change of the endless carrier-chains will throw or shift the cutting edge of each bucket toward the steering end of the machine instead of the forward end. When thus altered, it is only necessary that the endless carrier-chains be so adjusted as to lower the cutting-buckets to their proper positions below the machine-frame, when the bucket will cut the ditch or canal while the machine is driven backward instead of forward. When thus operated, the propelling or drive shaft will be rotated in an opposite direction to that during the forward movement of the machine, and such changes in the arrangement of the connecting mechanism as necessity may require should be made. In thus working the machine the steering wheel or roller and the supporting rollers or wheels will travel upon the surface of the uncut ground or upon tracks laid thereon instead of traveling upon the finished bottom of the canal, as they do during the forward movement of the machine.

It is also obvious that where only one embankment is to be thrown up or constructed one of the endless carrier-chains with its series of buckets may be thrown out of gear or entirely removed, and the remaining endless carrier with its series of buckets perform the required work.

Having thus fully described my invention, what I claim as new, and desire protection in by Letters Patent of the United States, is—

1. An excavating-machine that travels constantly forward lengthwise with the excavation which it is making while at work, and having cutting devices that move crosswise of the excavation during the forward travel of the machine without reciprocating or intermittent movements and which excavate the soil starting substantially from points along the center line of excavation and carry and deposit it alongside of the excavation to form a side wall in one continuous operation, the same being constructed and operating substantially in the manner herein set forth and described.

2. In a land-excavator for the construction of canals, ditches, trenches or similar works, the combination with a movable main frame, of excavating-buckets arranged to cut transverse of the machine outward starting substantially from its center and to convey and deposit the excavated material alongside of the excavation so as to form an embankment thereof, and of mechanism for imparting longitudinal movement to the machine and imparting transverse movement to the excavating-buckets during the longitudinal movement of the machine, substantially as herein shown and described.

3. In a land-excavator, the combination with the main frame, of the laterally-traveling mechanism, a series of excavating-buckets secured to and carried by said mechanism, said buckets cutting the soil during the travel thereof crosswise of the machine starting at a point at or near the center line of the cut and conveying the same and delivering it at the sides thereof, and of mechanism for imparting longitudinal movement to the machine and driving the laterally-traveling mechanism carrying the excavating-buckets during the longitudinal movement of the machine, substantially as shown and described.

4. The combination in a forwardly-traveling land-excavating machine, of laterally-traveling excavating devices for cutting the soil during the forward travel of the machine and delivering the same at the sides of the cut during the movement of the machine in one direction, and of mechanism for imparting motion to the machine and the laterally-traveling devices, substantially as herein shown and described.

5. In a forwardly-traveling excavating-machine, the combination with the main frame, of devices for imparting vertical adjustment to said frame, the laterally-traveling excavating devices which cut the soil and convey and deliver the same at either side of the machine, and of mechanism for imparting longitudinal movement to the machine and operating the laterally-traveling excavating devices, substantially as herein shown and described.

6. The combination with a forwardly-traveling land-excavating machine, of the endless-chain carrier traveling transverse of the machine, of mechanism for imparting longitudinal motion to the machine and transverse movement to the endless-chain carrier, and a series of cutting devices secured to and carried by the endless-chain carrier, said devices working outwardly from and cutting the soil crosswise of the machine starting from at or near the center of the excavation being made and conveying and depositing the excavated material alongside of the excavation so as to form an embankment thereof, substantially as herein shown and described.

7. In a land-excavating machine, the combination with the main frame, of mechanism for imparting forward movement thereto, of the front and rear endless-chain carriers arranged transverse of the machine, of mechanism for driving the chain carriers in opposite directions during the forward movement of the machine, and of a series of cutting-buckets secured to and carried by each of the endless carriers, said buckets cutting the soil and conveying and delivering the same at each side of the machine, substantially as herein shown and described.

8. In a land-excavating machine, the combination with the main frame, of laterally-traveling cutting devices arranged to work outward from and to cut the soil crosswise of the machine starting from a point at or near the center of the excavation being made and carry and deposit the excavated material alongside of the excavation so as to form an embankment thereof, and of mechanism for imparting forward and lateral movement to the cutting devices, substantially as herein shown and described.

9. In a land-excavating machine, the combination with the laterally-traveling cutting devices arranged to cut in advance of and crosswise of the machine and to convey and deposit the material being removed alongside of the excavation so as to form an embankment thereto, of adjusting devices for regulating or shifting the cutting devices to either side of the center of the machine, and of mechanism for imparting longitudinal and lateral movement to the cutting devices, substantially as herein shown and described.

10. In a forwardly-traveling land-excavating machine, the combination with the main frame, of laterally-traveling cutting devices arranged to cut in advance and crosswise of the machine, and to convey and deposit the excavated material alongside of the excavation so as to form an embankment thereof, of devices for imparting a vertical adjustment to said cutting devices to regulate the cutting depth thereof and a lateral adjustment for throwing the cutting devices to either side of the machine center, and of mechanism for imparting longitudinal movement to the machine and lateral movement to the cutting devices during the longitudinal movement of the machine, substantially as herein shown and described.

11. The combination in a land-excavator, of the main frame composed of a series of longitudinal beams, the screw-rods for adjustably connecting the said beams, the truck-frame upon which the main frame is mounted, and of the screw-posts for giving adjustment to the main frame, substantially as herein shown and described.

12. In a forwardly-traveling land-excavating machine, the combination with the main frame, of the endless traveling chain carriers arranged to travel crosswise of the machine, of mechanism for imparting longitudinal travel to the machine and driving the endless-chain carriers in opposite directions transverse of the machine, a series of cutting-buckets secured to each of the endless-chain carriers, each bucket arranged to cut the soil in advance of the preceding one and remove the cut soil to the sides of the machine, a hinged bottom to each bucket, and of devices for automatically locking and releasing the hinged bottom of the buckets during the travel of the endless carriers, substantially as herein shown and described.

13. In a forwardly-traveling land-excavating machine, the combination with laterally-traveling devices arranged to cut outwardly from the machine toward the sides of the excavation being made during the movement of the machine in one direction and to deliver the soil to form side walls to the cut, of mechanism for imparting forward motion to the machine and lateral movement to the cutting devices during the forward movement of the machine, substantially as herein shown and described.

14. In a forwardly-traveling excavating-machine, the combination with the endless carriers arranged transverse of the machine, one in advance of the other, the cutting-buckets secured upon and carried by the endless carriers, each bucket arranged to cut in advance of the preceding one, the hinged bottom for the bucket, the oscillatory cross-rod carrying a catch which engages the end of the hinged bottom, a trip-cam for releasing or locking the hinged bottom by throwing the catch out of or into engagement therewith, the bell-crank lever for holding the hinged bottom closed while being locked, devices with which the trip-cam and the bell-crank lever engage, during the travel of the endless carriers, in order to release or lock the hinged bottoms of the cutting-buckets, and of mechanism for imparting forward travel to the machine and driving the transverse endless traveling carriers in opposite directions, substantially as herein shown and described.

15. A forwardly-traveling land-excavating machine provided with transverse traveling devices which cut the soil from the inside of the excavation being made to the outer walls thereof and convey and deliver the cut soil to the sides of the ditch or canal, so as to form embankments thereof during the traveling movement of the machine in the one direction, substantially as herein shown and described.

16. In an excavating-machine, the combination with a frame, of excavating means working outwardly transversely of the machine which convey and deposit the excavated material alongside of the excavation being made so as to form an embankment thereof starting from at or near the center of the excavation being made, and connected mechanism for simultaneously moving the machine and actuating said excavating and delivering means during the movement of the machine, substantially as herein shown and described.

17. In a forwardly-traveling excavating-machine, the combination with the main frame, of the endless traveling chain carriers arranged transverse of the machine, a series of skew-shaped cutting-buckets secured to and carried by said carriers, the inclination of pitch being toward the front of the machine, so that each bucket will cut in advance of the preceding one, the hinged bottoms for the buckets, devices for automatically releasing and locking the same during the movement of the endless traveling carriers, and of mechanism for imparting forward motion to the machine and driving the endless traveling carriers in opposite directions, substantially as herein shown and described.

18. In a forwardly-traveling land-excavating machine, the combination with the laterally-traveling endless-chain carrier, of a series of cutting-buckets for cutting and removing the soil crosswise of the machine, a cross-rod securing each bucket to the laterally-traveling carrier at its forward end, a link connection between the rear end of the buckets and the said carrier, a hinged bottom to the buckets, devices for automatically releasing and locking the same during the travel of the endless carrier, a cutting-blade attached to the front bottom edge of the buckets and a cutting-blade fastened to the front side edge thereof, the toe of said blade extending upwardly higher than the bucket, substantially as herein shown and described.

19. In a forwardly-traveling land-excavator, the combination with the main frame of the machine, of the posts or uprights secured thereto, the cross-beams connected to said uprights or posts, the slide bearing-boxes mounted upon said cross-beams, the longitudinal drive-shafts working in said bearing-boxes, connection between said drive-shafts and the mechanism for driving the machine forward, the sprocket-wheels secured to the forward end of the drive-shafts, the chain carriers working at right angles to the machine and over said sprocket-wheels, and sprocket-wheels working in bearing-boxes located within channel-iron cross-beams secured to the main frame, a series of cutting-buckets secured to and carried by each of the chain carriers, which buckets cut the soil and convey and deposit the same to the sides of the machine, and of devices for automatically dumping the buckets, substantially as herein shown and described.

20. In a land-excavating machine, the combination with the oppositely laterally traveling endless carriers, of the cutting-buckets secured thereto and arranged to cut crosswise of the machine, one in advance of the others, the sprocket-wheels over which the carriers travel, devices for adjusting the laterally-traveling carriers, the idler-wheels for the forward carrier carried by a slide-block, and of the rack-and-pinion mechanism for laterally adjusting the slide-block carrying the idler-wheels to tighten or loosen the forward carrier, substantially as herein shown and described.

21. In a land-excavating machine, the combination with the main frame, of the front cross-beam, the slide-block carrying the idler-wheels for the front endless laterally-traveling carrier, mounted upon said cross-beam, the rack-plate carried thereby, a rack-pinion engaging the rack-plate for imparting lateral movement to the slide-block, a shaft for rotating the rack-pinion, said shaft working through the brackets attached to the cross-beam and an adjustable screw-post, and a friction-clutch for locking the operating shaft of the rack-pinion, substantially as herein shown and described.

22. In a land-excavating machine, the combination with the main frame, of the forward channel-iron cross-beams attached thereto, the fixed and slide bearing-blocks located within the cross-beams, the screw-rods extending through the fixed and slide bearing-boxes, and of mechanism for operating the screw-rods to move the slide bearing-blocks toward or from the center of the machine, substantially as herein shown and described.

23. In a land-excavating machine, the combination with the main frame, of the forward channel-iron cross-beams attached thereto, the fixed and slide bearing-blocks located within the said cross-beams, the screw-rods extending through the fixed and slide bearing-blocks, the bevel-gears mounted upon the outer ends of said rods, the bevel-pinions, mounted upon a short longitudinal shaft, meshing with the said gears, a longitudinal shaft for operating the bevel-pinions, and of a universal-joint connection between said shaft and the bevel-pinion shaft, substantially as herein shown and described.

24. In a land-excavating machine, the combination with the main frame, of the truck-frames for supporting the main frame, the rollers secured within the truck-frames, the worms mounted upon the axles of the rollers, the worm-pinions secured upon the drive-shaft for the rollers, the belt-wheel shaft, the universal-joint connections between the drive-shaft and the belt-wheel shaft, the adjustable steering-wheel for supporting the rear end of the machine, and of mechanism for driving the belt-wheel shaft from the engine, the motion of which is transmitted to the drive-shaft so as to impart forward motion to the machine, substantially as herein shown and described.

25. In an excavating-machine, the combination with a series of cutting devices, of mechanism connected therewith for conveying the buckets transverse of the machine, each bucket being arranged to cut outwardly from the machine in advance of the preceding one from the inside of the excavation to the outer wall thereof and to convey and deposit the cut material alongside of the cut or excavation to form side embankment, and of connected mechanism for simultaneously advancing the machine along the work being excavated and actuating the cutting devices.

In testimony whereof I affix my signature, in presence of two witnesses, this 31st day of March, 1897.

MILTON A. WHEATON.

Witnesses:
N. CURTIS LAMMOND,
N. A. ACKER.